[3,522,268]

Patented July 28, 1970

3,522,268
PROCESS FOR SEPARATION AND RECOVERY OF OXAZOLE
Reginald Harold Hall, Carshalton, Surrey, and Dennis Futvoye Francis, Tadworth, England, assignors to BP Chemicals (U.K.) Limited, London, England, a British company
No Drawing. Continuation of application Ser. No. 666,942, Sept. 11, 1967. This application Aug. 21, 1969, Ser. No. 853,607
Claims priority, application Great Britain, Sept. 15, 1966, 41,179/66; Jan. 12, 1967, 1,721/67
Int. Cl. C07d 85/44
U.S. Cl. 260—307                    5 Claims

ABSTRACT OF THE DISCLOSURE

The invention provides a method of separating and recovering oxazole from aqueous acetonitrile solutions by complexing with inorganic cadmium salts followed by decomposition.

---

This application is a continuation of application S.N. 666,942, filed Sept. 11, 1967 and now abandoned.

The present invention relates to the separation and recovery of oxazole from aqueous solutions containing it and more particularly to the separation of oxazole from aqueous mixtures containing it together with acetonitrile.

Processes for the production of acrylonitrile by the vapour phase catalytic reaction of propylene, oxygen and ammonia are well known. The crude acrylonitrile reaction product from such processes may also include, in addition to acrylonitrile, by-products such as acetonitrile and oxazole, the latter in trace amounts only. These substances may be separated from the acrylonitrile by extractive distillation with water. The aqueous solution of acetonitrile and oxazole thus obtained can then be fractionally distilled to give a head product which is substantially the acetonitrile-water azeotrope containing the main bulk of the oxazole. The concentration of the latter in this solution is generally about 0.03-0.2% w./v. Subsequent isolation of oxazole from this solution by distillation or extraction procedures is very difficult, partly because of the very low concentrations of oxazole in the solution and partly because of the presence of relatively large amounts (e.g. 10-15% w./v.) of water.

It has now been found possible, according to the present invention, to utilise the formation of complexes of oxazole with inorganic salts in separating and recovering oxazole from aqueous solutions containing it in admixture with acetonitrile.

Accordingly the present invention is a process for the separation and recovery of oxazole from aqueous solution containing it together with acetonitrile which comprises treating the solution with a suitable inorganic salt or salts to effect precipitation of an oxazole inorganic salt complex, separating the precipitated solid, treating the separated solid to effect decomposition to produce oxazole and recovering the oxazole.

Examples of suitable inorganic salts are mercuric chloride, cupric salts such as cupric chloride and cupric thiocyanate, cadmium bromide or cadmium chloride, the use of cadmium salts is preferred.

The aqueous solution of oxazole and acetonitrile may be treated with the inorganic salt in any suitable manner. Thus, the inorganic salt may be added to the aqueous solution in the form of the solid or as a solution in for example water or acetonitrile or alternatively formed in situ.

The oxazole-inorganic salt complex which precipitates can be filtered or centrifuged off and freed from solvent, by any suitable method. In this latter respect recrystallisation of the complex for example from dilute hydrochloric acid or alternatively prolonged treatment with hot water may sometimes be necessary in order to completely remove acetonitrile.

Decomposition of the separated solid complex to yield free oxazole may be carried out by heating the complex alone or in an inert high boiling diluent such as liquid paraffin or water. Alternatively, the solvent free solid can be decomposed by water, e.g. by boiling, to obtain an aqueous solution of oxazole from which the latter can be recovered by fractional distillation. In the absence of acetonitrile the separation of oxazole from water by distillation is not particularly difficult and substantially pure oxazole can be obtained as a head product. Any small amounts of water which may be present in the distilled oxazole can be removed by drying over a desiccant such as solid potassium hydroxide and dry oxazole recovered by distillation. The inorganic salt recovered from the decomposition of the complex may in some cases be re-used in the process.

The process of the present invention is illustrated further with reference to the following example in which parts by weight and parts by volume bear the same relationship to each other as grams to millilitres.

EXAMPLE 1

The crude acetonitrile-water azeotrope obtained by fractional distillation of the base product from the hydroextraction column in the acrylonitrile plant was subjected to continuous azeotropic dehydration with benzene. The aqueous phase decanted continuously from the still-head was an aqueous solution of acetonitrile and contained about 0.5% w./v. of oxazole.

This solution (1500 p.b.v.) was stirred at room temperature and powdered ammonium sulphate was added gradually until no more would dissolve. The pH of the mixture was adjusted to 7-8 by the addition of aqueous ammonia (s.g. 0.880) and the two liquid phases were separated. The upper phase (200 p.b.v.) consisted largely of acetonitrile and contained about 2.7% w./v. of oxazole. It was stirred at room temperature and powdered mercuric chloride (40 p.b.w.) was added. The chloride dissolved and a white crystalline oxazole-mercuric chloride complex separated. This was collected and dried in vacuo at room temperature to give white crystals (29.15 p.b.w.) M.P. 147–148° (rapid heating).

The crystals were suspended in water (100 p.b.v.) and the mixture was heated under an efficient fractionating column. Oxazole was obtained as a head fraction and was collected until the B.P. rose to ca. 98°. The distillate was dried over solid potassium hydroxide and the dried liquid (3 p.b.w.), was redistilled to give pure oxazole (2.5 p.b.w.), B.P. 68–69°, identical (infra-red spectrum) with a synthetic specimen of oxazole prepared by the method of Bredereck and Bangert (Chem. Ber., 1964, 97, 1414).

EXAMPLE 2

A sample (13.45 p.b.w.) of the dry oxazole-mercuric chloride complex obtained substantially according to the procedure of Example 1 was heated in the dry state in a distillation apparatus. It melted and started to decompose at about 150°. The temperature of the heating bath was then raised slowly to 240° and distillate was collected up to a head temperature of 78°. The colourless, mobile distillate (1.26 p.b.w.) was shown by analysis to be oxazole of about 96% purity. The main impurity present was water.

EXAMPLE 3

A sample (19.40 p.b.w.) of the dry oxazole-mercuric chloride complex obtained substantially according to the procedure of Example 1 was mixed with liquid paraffin ("Risella Oil 17f"; 50 p.b.v.) and the mixture was stirred and heated in a distillation apparatus. Decomposition of the complex began at about 110° and colourless liquid started to distil when the bath temperature reached about 170°. The bath temperature was finally raised to 270°. The distillate (2.30 p.b.w.), B.P. mainly 68°, a colourless mobile liquid, was shown by analysis to be oxazole of about 96% purity.

EXAMPLE 4

The crude acetonitrile-water azeotrope (10,000 p.b.v.) obtained by fractional distillation of the base product from the hydro-extraction column in the acrylonitrile plant and containing about 0.18% w./v. of oxazole was stirred at room temperature while powdered cupric chloride dihydrate (30 p.b.w) was added slowly. The mixture was stirred for 1 hr. and kept at 0–5° overnight. The crystalline oxazole-cupric chloride complex which had separated was collected by filtration and dried at room temperature under reduced pressure to give a pale blue solid (6.6 p.b.w.).

The main bulk (6.0 p.b.w.) of this solid was suspended in water (50 p.b.v.) and the mixture was heated under an efficient fractionating column. Distillate (4.0 p.b.v.) was collected at a head temperature between 70° and 100°. Solid ammonium sulphate was added to this distillate until it was saturated and the two phases which formed were separated. The upper aqueous phase was dried over solid potassium hydroxide to give a colourless mobile liquid (about 1.0 p.b.w.) which was shown by analysis to be oxazole of about 95% purity. The main impurity was water.

EXAMPLE 5

An aqueous solution of acetonitrile containing about 0.35% w./v. of oxazole was obtained substantially by the procedure described in Example 1, paragraph 1.

This solution (2000 p.b.v.) was stirred at room temperature and magnesium sulphate monohydrate (450 p.b.w.) was added. When this had dissolved the pH of the mixture was adjusted to 7 and the two phases were separated. The upper phase (250 p.b.v.) consisted largely of acetonitrile and contained about 1.4% w./v. of oxazole. It was stirred vigorously and powdered cupric chloride dihydrate (40 p.b.w.) was added slowly. The mixture was kept overnight at 0–5° and the solid which separated was collected and dried at room temperature under reduced pressure. The blue solid (5.07 p.b.w.) thus obtained was heated in the dry state in a distillation apparatus. Its colour changed to green at 100° and finally to black when the bath temperature reached 240°. A colourless liquid (1.22 p.b.w.) distilled. This was shown by analysis to be oxazole of purity similar to that obtained in Example 4.

EXAMPLE 6

The crude acetonitrile-water azeotrope (2,000 p.b.v.) obtained by fractional distillation of the base product from a hydro-extractive distillation of crude acrylonitrile (cf. Example 1 above) and containing about 0.31% w./v. of oxazole was stirred at room temperature while a solution of cadmium chloride hydrate (25 p.b.w. of $CdCl_2.2\tfrac{1}{2}H_2O$) in water (20 p.b.v.) was added slowly. The mixture was stirred for 3 hr., during which time a white precipitate of the oxazole-cadmium chloride complex separated, and kept overnight at room temperature.

The complex was collected by filtration, washed with a little ethane-1,2-diol (30 p.b.v.) to remove traces of acetonitrile, and added to water (200 p.b.v.). The mixture was boiled under an efficient fractionating column and distillate was collected until the head temperature rose to 100°. The distillate (5.32 p.b.w.) contained 65% w./w. of oxazole and traces of acetonitrile. The overall recovery of oxazole in the form of a concentrated aqueous solution was thus about 56%.

When cupric chloride was used in place of cadmium chloride as precipitant under comparable conditions the overall recovery of oxazole was about 40%.

In other similar experiments with cadmium chloride the oxazole-cadmium chloride complex was washed with ether or a little cold water instead of with ethane-1,2-diol. Similar results were obtained.

EXAMPLE 7

The experiment of Example 6 was repeated using more cadmium chloride hydrate (40 p.b.w. of $CdCl_2.2\tfrac{1}{2}H_2O$) in water (30 p.b.v.). The overall recovery of oxazole as a 33% w./w. solution (12.5 p.b.w.) in water was 67%. The solution contained only traces of acetonitrile.

The acetonitrile-water mother liquors which were obtained after filtering off the oxazole-cadmium chloride complex were treated with more cadmium chloride (5 p.b.w of $CdCl_2.2\tfrac{1}{2}H_2O$) in water (5 p.b.v.). No more precipitate was obtained. The mixture was distilled to recover the acetonitrile Distillation was stopped when the volume of the residual liquid was about 50 parts. This residue contained all the cadmium chloride which had not precipitated in the form of a complex and was used to process more oxazole-containing material (see below).

The aqueous solution of cadmium chloride remaining after decomposition of the oxazole-cadmium chloride complex and distillation of the oxazole contained only a very small amount of insoluble material (0.4 p.b.w.). This was filtered off and the filtrate was concentrated until it was almost saturated with cadmium chloride. This solution was added to the cadmium chloride solution recovered as described in the previous paragraph. The mixture was used to process a further quantity (2,000 p.b.v.) of the acetonitrile-water mixture containing 0.31% w./v. oxazole (cf. Example 6). The procedural details were the same as in Example 6 except that the precipitated oxazole-cadmium chloride complex was washed with a little saturated aqueous cadmium chloride solution (20 pb.v.) instead of with ethane-1,2-diol. The oxazole was recovered from the complex as in Example 6.

The overall recovery of oxazole as a 31% w./w. solution (12.8 p.b.w.) in water was about 64%. Oxazole was readily recovered from such an aqueous solution in substantially anhydrous form by fractional distillation (cf. Example 1)

EXAMPLE 8

A solution of cadmium bromide tetrahydrate (10.8 p.b.w. of $CdBr_2 \cdot 4H_2O$) in water (9.6 p.b.v.) was added to a stirred mixture (24 p.b.v.) of oxazole, water, and acetonitrile of B.P. 65–66°, containing 9.5% w./v. of oxazole. The white precipitate of the oxazole-cadmium bromide complex which separated was collected by filtration, washed with a little saturated aqueous cadmium bromide solution, and added to water (100 p.b.v.). The mixture was boiled under an efficient fractionating column and distillate was collected until the head temperature rose to 100°. The distillate (5.16 p.b.w.) contained 1.89 p.b.w. of oxazole and only traces of acetonitrile.

EXAMPLE 9

The experiment of Example 6 was repeated except that the precipitated oxazole-cadmium chloride complex was washed with saturated cadmium chloride solution instead of with ethane-1,2-diol.

The oxazole recovered from the complex, exactly as in Example 6, was obtained in the form of an aqueous solution (5.72 p.b.w.) which contained 70% w./w. of oxazole and about 10% w./w. of acetonitrile.

The main bulk (5.42 p.b.w.) of this material was added to a stirred solution of cadmium chloride (26 p.b.w. of $CdCl_2 \cdot 2\tfrac{1}{2}H_2O$) in water (17 p.b.v.). The precipitated complex was collected after some hours, washed with 10% w./w. aqueous cadmium chloride solution, and added to water (100 p.b.w.). The mixture was boiled under an efficient fractionating column (see Example 1) and the following fractions were collected: (1) B.P. 68.5–70.5°, 3.08 p.b.w.; and (2) B.P. 70.5–100°, 1.63 p.b.w.

Fraction (1) consisted of ca. 95% w./w. oxazole, 1–2% w./w. acetonitrile, and 3.6% w./w. water. Fraction (2) contained 41% w./w. oxazole, less than 0.5% w./w. acetonitrile, and the remainder water.

EXAMPLE 10

The first part of the experiment of Example 6 was repeated except that the precipitated oxazole-cadmium chloride complex was washed with 10% w./w. aqueous cadmium chloride solution instead of with ethane-1,2-diol.

The solid complex was added to water (50 p.b.w.) and the mixture was boiled under reflux for 3 hr., cooled, and filtered. The solid recovered was washed with a little 10% w./w. aqueous cadmium chloride solution and added to water (100 p.b.w.). Oxazole was recovered from this mixture by fractional distillation through an efficient column. The following fractions were collected: (1) B.P. 68.5–70°, 3.30 p.b.w.; and (2) B.P. 70–100°, 1.46 p.b.w.

Fraction (1) contained 94% w./w. oxazole and 1.2% acetonitrile; fraction (2) contained 35% w./w. oxazole, less than 0.5% acetonitrile, remainder water.

EXAMPLE 11

The experiment of Example 6 was repeated except that the precipitated oxazole-cadmium chloride complex was washed with a little 10% w./w. aqueous cadmium chloride solution instead of with ethane-1,2-diol.

Oxazole was recovered from the complex exactly as in Example 6, distillate being collected in one fraction up to a head temperature of 100°. The liquid containing cadmium chloride remaining in the distilling flask was cooled and the whole of the distillate was added to it. The precipitated oxazole-cadmium chloride complex was collected after some hours, washed with a little 10% w./w. aqueous cadmium chloride solution, and decomposed as above to recover the oxazole. Two fractions were collected: (1) B.P. 68.5–71°, 2.84 p.b.w.; and (2) B.P. 71–100°, 2.26 p.b.w.

Fraction (1) contained 90% w./w. oxazole, 0.6% w./w. acetonitrile, remainder water. Fraction (2) contained 14% w./w. oxazole, remainder water.

EXAMPLE 12

A sample (10,000 p.b.v.) of the crude acetonitrile-water azeotrope as used in Example 6 was stirred at room temperature while a solution of cadmium chloride (200 p.b.w. of $CdCl_2 \cdot 2\frac{1}{2} H_2O$ in water (125 p.b.w.) was added slowly. The mixture was kept overnight at room temperature.

The precipitated oxazole-cadmium chloride complex was collected and dissolved in 2 N-hydrochloric acid (640 p.b.v.) at 70°. The mixture was cooled and the solid complex which separated was collected. Analyses of a dried sample of the complex showed that it had the empirical formula $C_3H_3NO \cdot CdCl$.

The complex was added to water (500 p.b.w.) and the mixture was distilled through an efficient fractionating column to recover oxazole in the usual way. The following fractions were collected: (1) B.P. 68–71°, 11.10 p.b.w.; and (2) B.P. 71–100°, 10.15 p.b.w.

Fraction (1) contained 97% w./w. oxazole and about 0.02% acetonitrile. Fraction (2) contained about 30% w./w. oxazole and less than 0.01% acetonitrile.

What is claimed is:

1. A process for the separation and recovery of oxazole from an aqueous solution containing it together with acetonitrile which comprises adding to the solution an inorganic cadmium salt to effect precipitation of an oxazole complex with said salt, separating the precipitated salt, decomposing the separated solid by heating it above its decomposition temperature to produce oxazole, and recovering the oxazole.

2. A process as defined in claim 1, wherein said inorganic cadmium salt is cadmium chloride or cadmium bromide.

3. A process as claimed in claim 1, wherein the separated solid is decomposed by heating in an inert liquid medium.

4. A process as claimed in claim 3, wherein the inert liquid medium is a liquid paraffin or water.

5. A process as claimed in claim 4, wherein the oxazole is recovered by distillation of the liquid medium.

References Cited

Cornforth et al.: J. Chem. Soc., 1949, 1028–30.

ALEX MAZEL, Primary Examiner

R. V. RUSH, Assistant Examiner

U.S. Cl. X.R.

260—465.3